A. LEHRER.
SIGNALING DEVICE FOR AUTOMOBILES OR LIKE VEHICLES.
APPLICATION FILED NOV. 21, 1910.
998,356.
Patented July 18, 1911.
2 SHEETS—SHEET 1.
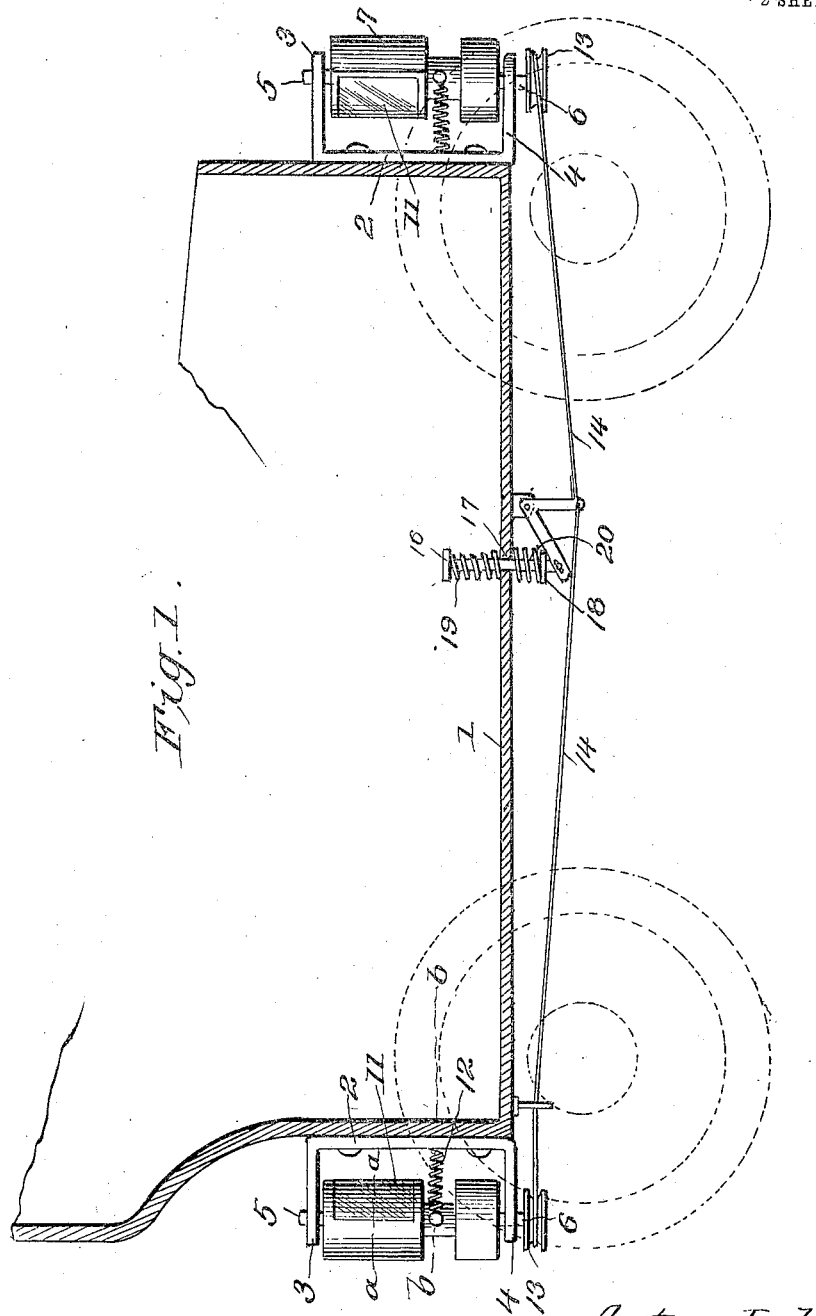
Inventor
Anton Lehrer
Witnesses
By
Attorney A. LEHRER.
SIGNALING DEVICE FOR AUTOMOBILES OR LIKE VEHICLES.
APPLICATION FILED NOV. 21, 1910.
998,356.
Patented July 18, 1911.
2 SHEETS—SHEET 2.
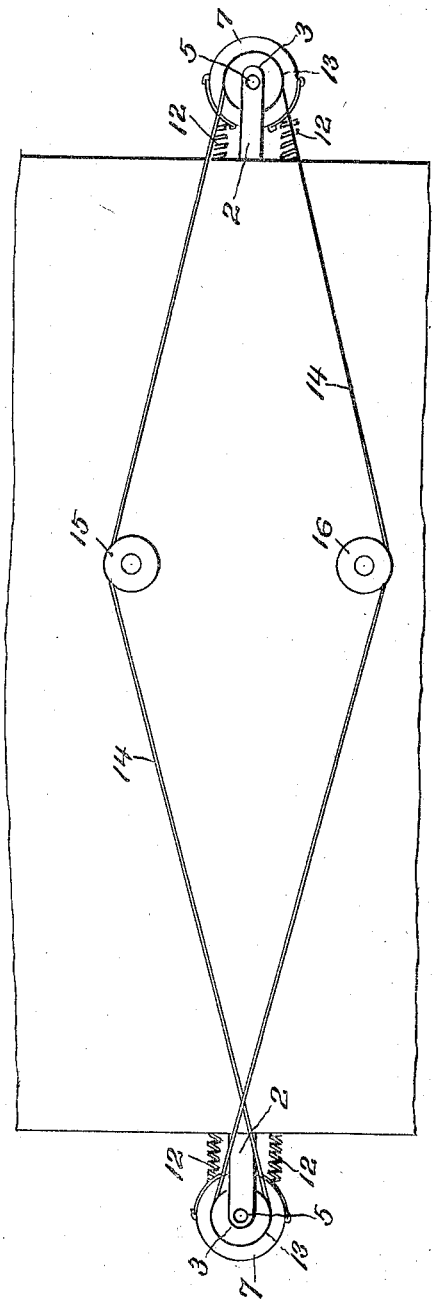
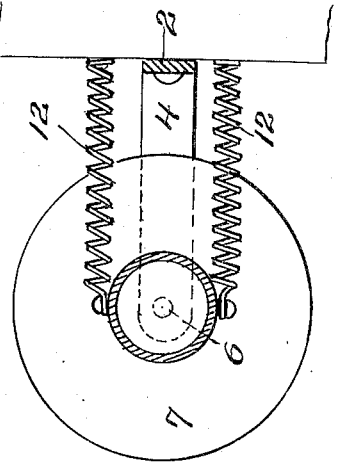
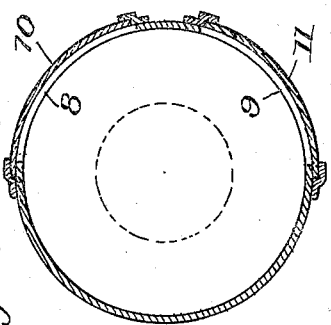
Inventor
Anton Lehrer

UNITED STATES PATENT OFFICE.

ANTON LEHRER, OF AUBURNDALE, WISCONSIN.

SIGNALING DEVICE FOR AUTOMOBILES OR LIKE VEHICLES.

998,356.  Specification of Letters Patent.  Patented July 18, 1911.

Application filed November 21, 1910. Serial No. 593,548.

*To all whom it may concern:*

Be it known that I, ANTON LEHRER, a citizen of the United States, residing at Auburndale, in the county of Wood and State of Wisconsin, have invented certain new and useful Improvements in Signaling Devices for Automobiles or Like Vehicles; and I do hereby declare the following to be a full, clear, and exact description of the invention, such as will enable others skilled in the art to which it appertains to make and use the same.

This invention relates to new and useful improvements in signaling devices for automobiles or like vehicles.

The object of this invention is the provision of a device of this character comprising a pair of signaling lights adapted to be mounted upon the front and rear of an automobile or the like, the same being so connected to a pair of treadles that upon the depression of either one the said signaling lights will be so turned as to indicate the direction in which the car is ab ut to proceed.

A further object of this invention is to improve and simplify devices of this character, rendering them comparatively simple and inexpensive to manufacture, reliable and efficient in use, and readily operated.

With the above and other objects in view, this invention resides in the novel features of construction, formations, combinations and arrangements of parts to be hereinafter more particularly described, claimed and illustrated in the accompanying drawing, in which—

Figure 1 is a longitudinal sectional view of a vehicle body having my invention applied thereto; Fig. 2 is a plan view thereof; Fig. 3 is a horizontal sectional view taken on the line *a—a* of Fig. 1, and Fig. 4 is a section taken on the line *b—b* of Fig. 1.

Referring to the drawing by characters of reference, the numeral 1 designates generally the frame of an automobile or other like vehicle. To the front and rear ends thereof are secured brackets 2, provided with parallel superimposed arms 3 and 4, between which arms, upon oppositely extending pintles 5 and 6, are pivoted lamps 7. These lamps are provided upon their sides, which lie adjacent the opposite ends of the automobile, with vertically extending openings 8 and 9, which are closed by suitable glass panels 10 and 11 of different shades, for a purpose which will later appear. The intermediate portions of the said lamps are connected upon their opposite sides to the brackets 2 by means of springs 12, which serve to normally retain the said lamps in such a position that the previously mentioned openings will always point in the direction of the vehicle, and will be hidden from the view of persons either in the front or rear of the said vehicle.

The pintles 6 carried by the lamps 7 are extended through the lowermost arm 4 of the bracket 2, and carry keyed to their lower terminals pulleys 13, around which cables 14 are passed, said cables extending beneath the body of the vehicle to treadles 15 and 16, to the lower ends of which the said cables 14 are secured. These treadles 15 and 16 are extended through openings 17 formed in the body of the vehicle in the convenient reach of the driver, and having secured to their lower ends, adjacent the points to which the cables are attached, collars 18, which serve to prevent the displacement of the said treadles 15 and 16 from the openings 17. The intermediate portion of these treadles 15 and 16 is yieldingly held in the same plane as the bottom of the floor of the vehicle by means of springs 19 and 20, which surround the said treadles and bear at their opposite ends against the floor of the vehicle, collars 18 and heads of the treadles 15 and 16 respectively.

As the glass panels which close the vertical openings are of different colors, it will be manifest that they may be seen in the day time and thus indicate in which direction the vehicle is about to turn without the lamps being lighted.

From the foregoing disclosure it will be apparent that upon the depression of either the right or the left treadle the front and rear lights will be so turned that the light upon the right or left sides of the said lamps will be so displayed that they may be easily seen by a person either in the front or the rear of the vehicle, and consequently they will know when the operator of the machine desires to make a turn either to the right or the left of the road and be able to act accordingly.

From the foregoing description, taken in connection with the accompanying drawing, it will be readily apparent that a signaling device is provided for which will answer all of the necessary requirements.

Having thus fully described this inven- tion, what I claim and desire to secure by Letters Patent is:

The combination with a vehicle body, of brackets having overlying arms secured to the opposite ends of the said vehicle body, of a lantern at each end of the vehicle each provided with oppositely extending shafts rotatably engaging the arms of the respective brackets for rotatably supporting the lantern, springs connecting the opposite sides of the lantern with the bracket, pulleys connected to the lower shafts carried by the lantern, a cable engaging the said pulleys, a bell crank lever connected with the cable, and a treadle pivotally connected with the bell crank lever and vertically movable within the vehicle body for the purpose of rotating the lanterns, substantially as and for the purposes set forth.

In testimony whereof I affix my signature in presence of two witnesses.

ANTON LEHRER.

Witnesses:
PAUL HAFENBREADL,
GEO. H. BAUER.

Copies of this patent may be obtained for five cents each, by addressing the "Commissioner of Patents, Washington, D. C."